(12) United States Patent
Jones (10) Patent No.: US 6,492,912 B1
(45) Date of Patent: Dec. 10, 2002

(54) SYSTEM AND METHOD FOR EFFICIENTLY NOTIFYING USERS OF IMPENDING ARRIVALS OF VEHICLES

(75) Inventor: Martin Kelly Jones, Vancouver (CA)

(73) Assignee: ArrivalStar, Inc., Delray Beach, FL (US)

( * ) Notice: Subject to any disclaimer, the term of this patent is extended or adjusted under 35 U.S.C. 154(b) by 0 days.

(21) Appl. No.: 09/516,876

(22) Filed: Mar. 1, 2000

Related U.S. Application Data (63) Continuation-in-part of application No. 09/395,501, filed on Sep. 14, 1999, and a continuation-in-part of application No. 09/163,588, filed on Sep. 30, 1998, and a continuation-in-part of application No. 08/852,119, filed on May 6, 1997, which is a continuation-in-part of application No. 08/434,049, filed on May 2, 1995, now Pat. No. 5,623,260, and a continuation-in-part of application No. 08/432,898, filed on May 2, 1995, now Pat. No. 5,657,010, and a continuation-in-part of application No. 08/432,666, filed on May 2, 1995, now Pat. No. 5,668,543, application No. 08/434,049, and application No. 08/432,398, and application No. 08/432,666, each is a continuation-in-part of application No. 08/407,319, filed on Mar. 20, 1995, which is a continuation-in-part of application No. 08/063,533, filed on May 18, 1993, now Pat. No. 5,400,020

(60) Provisional application No. 60/122,482, filed on Mar. 1, 1999, provisional application No. 60/115,755, filed on Jan. 13, 1999, and provisional application No. 60/039,925, filed on Mar. 7, 1997.

(51) Int. Cl.[7] ............................................... G08G 1/123
(52) U.S. Cl. .................. 340/994; 340/988; 340/989; 340/309.15; 340/7.48; 701/204; 455/456; 379/88.22; 379/88.25
(58) Field of Search ................................. 340/994, 995, 340/990, 991, 988, 989, 309.15, 7.48, 7.51, 7.52, 825.5; 701/204, 200; 708/111, 112; 342/357.07, 457, 357.03; 455/456, 412, 457, 517; 379/88.25, 88.22

(56) References Cited

U.S. PATENT DOCUMENTS

| | | | |
|---|---|---|---|
| 3,845,289 A | 10/1974 | French | 701/117 |
| 3,934,125 A | 1/1976 | Macano | 701/20 |
| 4,220,946 A | 9/1980 | Henriot | 340/994 |
| 4,325,057 A | 4/1982 | Bishop | 340/539 |

(List continued on next page.)

FOREIGN PATENT DOCUMENTS

| | | |
|---|---|---|
| FR | 2 559 930 | 8/1985 |
| FR | 2674355 | 9/1992 |
| JP | 52066175 | 6/1977 |
| JP | 63288400 | 11/1988 |

*Primary Examiner*—Benjamin C. Lee
(74) *Attorney, Agent, or Firm*—Thomas, Kayden, Horstemeyer & Risley LLP (57) ABSTRACT

A vehicle monitoring and notification system includes memory and logic. The memory stores data indicating when notification messages are scheduled for transmission to remote communications devices to warn users of impending arrivals of at least one vehicle. The logic is configured to determine that at least one of the notification messages is scheduled for transmission during a particular time period and to determine a number of notification messages that are scheduled for transmission during the particular time period. If the number exceeds a threshold number, the logic changes when the one notification message is scheduled for transmission.

12 Claims, 7 Drawing Sheets

U.S. PATENT DOCUMENTS

| | | | | |
|---|---|---|---|---|
| 4,350,969 A | | 9/1982 | Greer | 340/994 |
| 4,383,241 A | * | 5/1983 | Kojima et al. | 340/460 |
| 4,401,971 A | * | 8/1983 | Saito et al. | 340/460 |
| 4,438,422 A | * | 3/1984 | Nojiri et al. | 340/460 |
| 4,791,571 A | | 12/1988 | Takahashi et al. | 701/117 |
| 4,804,937 A | | 2/1989 | Barbiaux et al. | 340/459 |
| 4,812,843 A | | 3/1989 | Champion, III et al. | 340/905 |
| 4,956,777 A | | 9/1990 | Cearley et al. | 701/24 |
| 4,989,133 A | * | 1/1991 | May et al. | 709/102 |
| 5,014,206 A | | 5/1991 | Scribner et al. | 701/207 |
| 5,068,656 A | | 11/1991 | Sutherland | 340/989 |
| 5,113,185 A | | 5/1992 | Ichikawa | 340/995 |
| 5,122,959 A | | 6/1992 | Nathanson et al. | 701/117 |
| 5,131,020 A | | 7/1992 | Liebesny et al. | 455/422 |
| 5,168,451 A | | 12/1992 | Bolger | 701/117 |
| 5,218,629 A | | 6/1993 | Dumond, Jr. et al. | 455/412 |
| 5,223,844 A | | 6/1993 | Mansell et al. | 342/357.07 |
| 5,299,132 A | | 3/1994 | Wortham | 455/457 |
| 5,351,194 A | | 9/1994 | Ross et al. | 45/456 |
| 5,381,338 A | | 1/1995 | Wysocki et al. | 701/207 |
| 5,400,020 A | | 3/1995 | Jones | 340/994 |
| 5,444,444 A | | 8/1995 | Ross | 340/994 |
| 5,461,374 A | | 10/1995 | Lewiner et al. | 340/994 |
| 5,493,295 A | | 2/1996 | Lewiner et al. | 340/994 |
| 5,493,694 A | | 2/1996 | Vlcek et al. | 455/521 |
| 5,519,621 A | | 5/1996 | Wortham | 455/99 |
| 5,539,810 A | | 7/1996 | Kennedy, III et al. | 379/88.25 |
| 5,541,981 A | * | 7/1996 | Lynn | 379/88.25 |
| 5,587,715 A | | 12/1996 | Lewis | 342/357.03 |
| 5,594,650 A | | 1/1997 | Shah et al. | 701/207 |
| 5,602,739 A | | 2/1997 | Haagenstad et al. | 701/117 |
| 5,614,898 A | * | 3/1997 | Kamiya et al. | 340/995 |
| 5,623,260 A | | 4/1997 | Jones | 340/994 |
| 5,648,770 A | | 7/1997 | Ross | 340/994 |
| 5,657,010 A | | 8/1997 | Jones | 340/994 |
| 5,668,543 A | | 9/1997 | Jones | 340/994 |
| 5,673,305 A | | 9/1997 | Ross | 455/517 |
| 5,719,771 A | | 2/1998 | Buck et al. | 455/456 |
| 5,724,243 A | | 3/1998 | Westerlage et al. | 455/456 |
| 5,726,640 A | * | 3/1998 | Jones et al. | 340/825.22 |
| 5,736,940 A | | 4/1998 | Burgener | 340/994 |
| 5,739,774 A | * | 4/1998 | Olandesi | 340/994 |
| 5,751,245 A | | 5/1998 | Janky et al. | 342/357.07 |
| 5,760,742 A | | 6/1998 | Branch et al. | 342/457 |
| 5,808,565 A | | 9/1998 | Matta et al. | 340/994 |
| RE35,920 E | | 10/1998 | Sorden et al. | 342/457 |
| 6,006,159 A | | 12/1999 | Schmier et al. | 701/200 |
| 6,134,501 A | | 10/2000 | Oumi | 701/209 |

\* cited by examiner

| | TIME | Contact Information | Vechicle ID |
|---|---|---|---|
| Entry 1 | 6:30 | 1235670987 | 1112 |
| Entry 2 | 9:15 | 1235290945 | 2034 |
| Entry 3 | 12:45 | 1235467867 | 1390 |
| Entry 4 | 15:30 | 1234342313 | 0999 |

| Time Frame Number | Number of Not. Events |
|---|---|
| 1 | 3 |
| 2 | 0 |
| 3 | 4 |
| 4 | 8 |

FIG. 9A

| Time Frame Number | Number of Not. Events |
|---|---|
| 1 | 3 |
| 2 | 0 |
| 3 | 5 |
| 4 | 7 |

FIG. 9B

| Time Frame Number | Number of Not. Events |
|---|---|
| 1 | 3 |
| 2 | 2 |
| 3 | 5 |
| 4 | 5 |

FIG. 9C

| Time Frame Number | Number of Not. Events |
|---|---|
| 1 | 2 |
| 2 | 5 |
| 3 | 5 |
| 4 | 6 |

FIG. 9D

SYSTEM AND METHOD FOR EFFICIENTLY NOTIFYING USERS OF IMPENDING ARRIVALS OF VEHICLES

CLAIM OF PRIORITY AND CROSS REFERENCE TO RELATED APPLICATIONS

The current document claims priority to provisional U.S. patent application entitled, "BASE STATION APPARATUS AND METHOD FOR MONITORING TRAVEL OF MOBILE VEHICLE," assigned Ser. No. 60/122,482 and filed on Mar. 1, 1999. Further, the current document is a continuation-in-part of nonprovisional U.S. patent application entitled, "SYSTEM AND METHOD FOR ACTIVATION OF AN ADVANCE NOTIFICATION SYSTEM FOR MONITORING AND REPORTING STATUS OF VEHICLE TRAVEL," assigned Ser. No. 09/163,588 and filed on Sep. 30, 1998, and copending U.S. nonprovisional patent application entitled, "ADVANCE NOTIFICATION SYSTEMS AND METHODS UTILIZING A COMPUTER NETWORK," assigned Ser. No. 08/852,119, and filed on May 6, 1997. The current document also claims priority to and is continuation-in-part of U.S. patent application entitled, "BASE STATION APPARATUS AND METHOD FOR MONITORING TRAVEL OF A MOBILE VEHICLE," assigned Ser. No. 09/395,501, and filed Sep. 14, 1999, which further claims priority to provisional U.S. patent application entitled, "APPARATUS AND METHOD FOR MONITORING TRAVEL OF A MOBILE VEHICLE," assigned Ser. No. 60/115,755, and filed on Jan. 13, 1999. Furthermore, application Ser. No. 08/852,119 claims continuation-in-part priority to (a)–(d) hereafter, which the current document also claims continuation-in-part priority to:

(a) provisional application entitled, "ADVANCE NOTIFICATION SYSTEM AND METHOD UTILIZING A COMPUTER NETWORK," filed Mar. 7,1997 by M. K. Jones and assigned Ser. No. 60/039,925;

(b) nonprovisional application entitled, "ADVANCE NOTIFICATION SYSTEM AND METHOD UTILIZING PASSENGER-DEFINABLE NOTIFICATION TIME PERIOD," filed May 2, 1995 by M. K. Jones and assigned Ser. No. 08/434,049, now U.S. Pat. No. 5,623,260 to M. K. Jones that issued on Apr. 22, 1997;

(c) nonprovisional application entitled, "ADVANCE NOTIFICATION SYSTEM AND METHOD UTILIZING VEHICLE PROGRESS REPORT GENERATOR," filed May 2, 1995 by M. K. Jones and assigned Ser. No. 08/432,898, now U.S. Pat. No. 5,657,010 to M. K. Jones that issued on Aug. 12, 1997; and (d) nonprovisional application entitled, "ADVANCE NOTIFICATION SYSTEM AND METHOD UTILIZING PASSENGER CALLING REPORT GENERATOR," filed May 2, 1995 by M. K. Jones and assigned Ser. No. 08/432,666, now U.S. Pat. No. 5,668,543 to M. K. Jones that issued on Sep. 16, 1997;

where documents (b), (c), and (d) are each a continuation-in-part of the application entitled, "ADVANCE NOTIFICATION SYSTEM AND METHOD UTILIZING A DISTINCTIVE TELEPHONE RING," filed Mar. 20, 1995 by M. K. Jones and assigned Ser. No. 08/407,319, now abandoned, which in turn is a continuation-in-part of an application entitled, "ADVANCE NOTIFICATION SYSTEM AND METHOD," filed May 18, 1993 by M. K. Jones et al. and assigned Ser. No. 08/063,533, now U.S. Pat. No. 5,400,020 to M. K. Jones et al. that issued on Mar. 21, 1995, which are both part of the priority of the current document.

All of the foregoing applications and patents are incorporated herein by reference.

BACKGROUND OF THE INVENTION

1. Field of the Invention

The present invention generally relates to vehicle monitoring and messaging systems and, in particular, to a vehicle monitoring system and method capable of efficiently communicating a plurality of notification messages to warn users in advance of impending arrivals of vehicles.

2. Related Art

For at least the purposes of allowing advance preparation and scheduling, it would be desirable to know, in advance and with substantial accuracy, the expected arrival time of a mobile vehicle (for example but not limited to, a bus, truck, train, ship, plane, aircraft, etc.) at a particular location, such as a stop along a predefined route.

For example, consider a commercial bus station. A person picking up a friend or relative at the commercial bus station usually calls the bus station to find out the approximate arrival time (information which is oftentimes unavailable or inaccurate) and/or arrives at the bus station prior to the scheduled arrival time of the bus, hoping that the bus is not significantly delayed. With knowledge of accurate arrival information in advance, adjustments can be made to one's schedule to avoid having to wait extended periods for a vehicle.

Another example involves school children that ride school buses. The arrival times of school buses at scheduled stops can be significantly affected by many factors, such as maintenance problems, rush hour traffic, congested urban/suburban conditions, adverse weather, etc. As a result, school children often wait at bus stops for long periods of time, sometimes in adverse weather conditions, on unlit street corners, or in hazardous conditions near busy or secluded streets. An advance notification system that would inform the students of the proximity of the school bus would be desirable, so that students can avoid having to wait for the school bus at the bus stop for extended time periods.

Yet another example involves the commercial overnight package delivery industry, wherein packages are often delivered on a tight schedule. Customers sometimes wait on delivery of important time-critical packages, not knowing precisely when the delivery will occur. An advance notification system that can inform a customer of the precise arrival time of a delivery vehicle would be desirable in order to improve customer service and to allow the customer to better schedule a pickup of a delivered item.

Thus, a heretofore unaddressed need exists in the industry for better systems, apparatuses, and methods for accurately tracking and/or reporting the status of mobile vehicles as the vehicles travel.

SUMMARY OF THE INVENTION

The present invention overcomes many inadequacies and deficiencies of the prior art, as discussed hereinbefore. In general, the present invention provides an automated system and method for monitoring travel of vehicles and for efficiently communicating notification messages to warn users of impending arrivals of the vehicles.

In a broad sense, the system of the present invention includes memory and logic. The memory stores data indicating when notification messages are scheduled for transmission to remote communications devices to warn users of impending arrivals of at least one vehicle. The logic is configured to determine that at least one of the notification messages is scheduled for transmission during a particular time period and to determine a number of notification messages that are scheduled for transmission during the particular time period. If the number exceeds a threshold number, the logic causes the one notification message to be transmitted prior to the time period.

In accordance with another feature of the present invention, the system also includes a sensor and a vehicle control unit disposed on the one vehicle. The sensor transmits location signals indicating the location of the one vehicle. The vehicle control unit transmits a message indicating whether the vehicle is off schedule based on the location signals. The logic is configured to update the data stored in the memory based on the message transmitted by the vehicle control unit.

The present invention can also be viewed as providing a method for notifying users of impending arrivals of vehicles. The method can be broadly conceptualized by the following steps: storing data indicating when notification messages are scheduled for transmission to remote communications devices; determining that at least one of the notification messages is scheduled for transmission during a particular time period; determining a number of the notification messages that are scheduled for transmission during the particular time period; comparing the number to a threshold number; changing when the one notification message is scheduled for transmission in response to a determination that the number exceeds the threshold number; and notifying one of the users of an impending arrival of a vehicle via the one notification message.

Other features and advantages of the present invention will become apparent to one skilled in the art upon examination of the following detailed description, when read in conjunction with the accompanying drawings. It is intended that all such features and advantages be included herein within the teachings of the present invention, as set forth herein and as sought to be protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
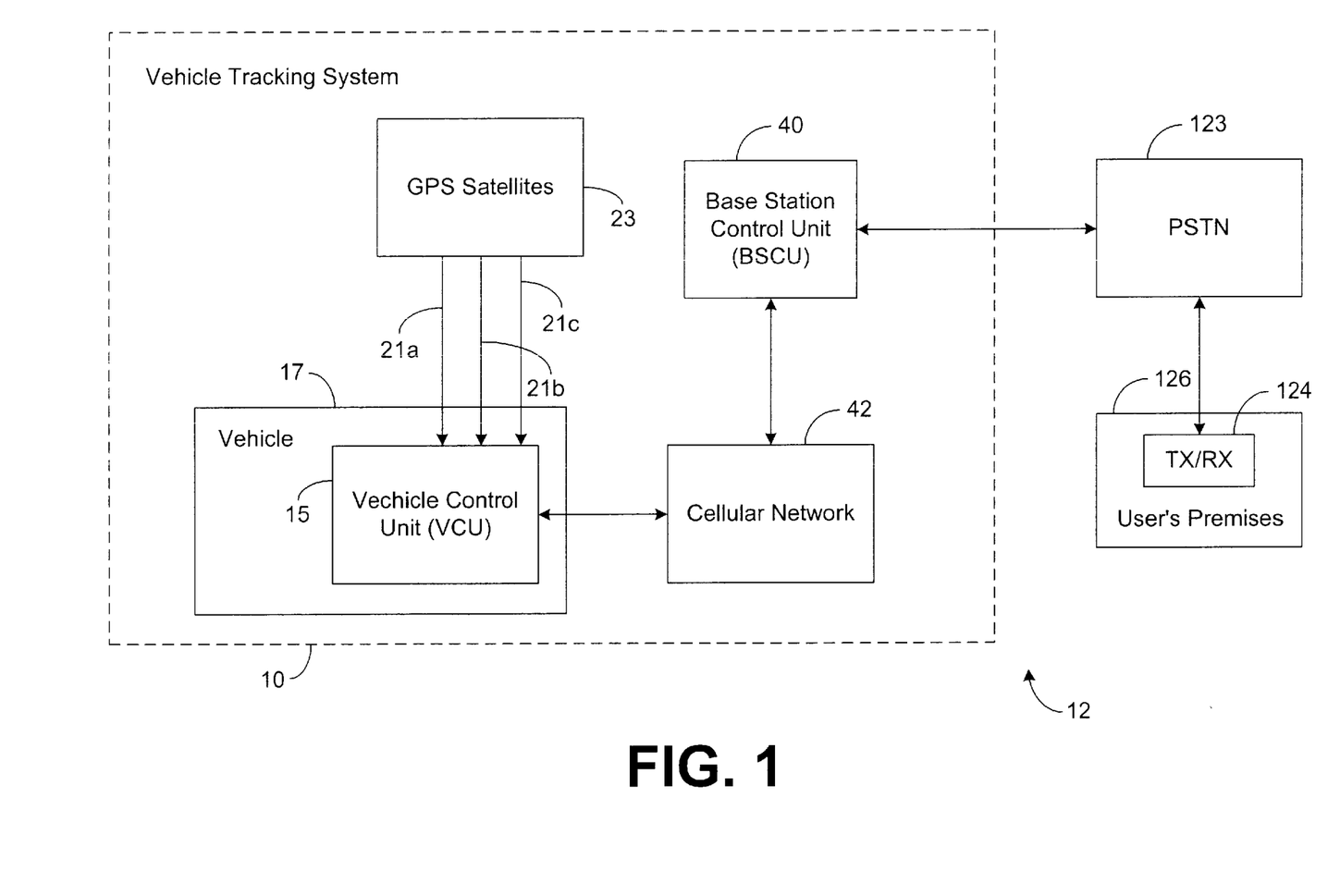
FIG. 1 is a block diagram illustrating a vehicle tracking system employed within the context of an advance notification system in accordance with the preferred embodiment of the present invention.

FIG. 1 depicts an automated vehicle tracking system 10 illustrating the principles of the present invention. As shown by FIG. 1, the vehicle tracking system 10 is preferably employed within the context of an automated advance notification system 12 that automatically provides advance notice of impending arrivals of vehicles at destinations or other locations.

As depicted in FIG. 1, a vehicle control unit (VCU) 15 is disposed on a mobile vehicle 17, which is capable of transporting the VCU 15 over various distances. U.S. patent application entitled, "System and Method for an Advance Notification System for Monitoring and Reporting Proximity of a Vehicle," assigned Ser. No. 09/163,958, and filed on Sep. 30, 1998, which is incorporated herein by reference, describes an exemplary VCU 15 that may be used to implement the principles of the present invention.

In the preferred embodiment, the vehicle 17 is a delivery vehicle for delivering items to a destination or for picking up items at a destination. Note that items can include many various types of packages or goods to be delivered or picked up. Furthermore, items can also include persons to be picked up or delivered, such as when a bus picks up and/or delivers passengers at different bus stops. Preferably, the vehicle 17 travels along a predetermined route in making its deliveries, and the vehicle 17 may make numerous stops along its route in order to deliver or pick up different items at different locations.

In the context of this document, a "vehicle" is any structure capable of moving across or through the Earth's surface and/or atmosphere. Examples of a "vehicle" include, but are not limited to, an automobile, an aircraft, a train, or a boat. A "vehicle" may also be a person that carries the VCU 15 while walking or running.

Vehicle Control Unit

Figure 2:
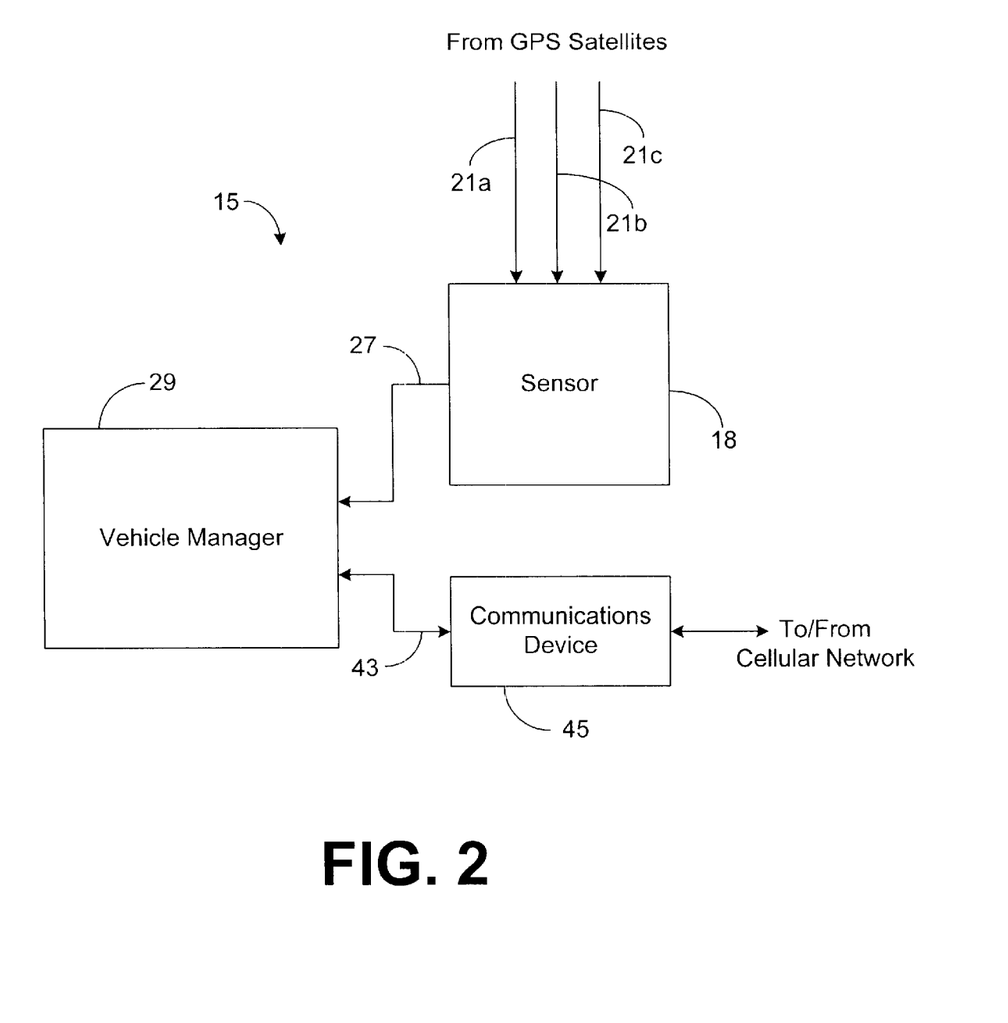
FIG. 2 is a block diagram illustrating a more detailed view of a vehicle control unit depicted in FIG. 1.

A more detailed view of the VCU 15 is depicted in FIG. 2. A sensor 18 within VCU 15 is configured to determine the location of the sensor 18 relative to a predetermined reference point. In the preferred embodiment, sensor 18 is a global positioning system (GPS) sensor, although other types of positioning systems and/or sensors can be utilized. For example, other types of sensors 18 that may be used to implement the principles of the present invention include, but are not limited to, an odometer or sensors associated with Glonass, Loran, Shoran, Decca, or Tacan. The GPS sensor 18 of the preferred embodiment is configured to receive signals 21a–21c from a plurality of GPS satellites 23, and as known in the art, sensor 18 is designed to analyze signals 21a–21c to determine the sensor's location or coordinate values relative to a predetermined reference point.

For example, in the preferred embodiment where sensor 18 is a GPS sensor, the sensor 18 determines the sensor's location values relative to the Earth's zero degree latitude and zero degree longitude reference point, which is located at the intersection of the Equator and the Prime Meridian. U.S. Pat. No. 5,781,156 entitled, "GPS Receiver and Method for Processing GPS Signals" and filed on Apr. 23, 1997 by Krasner, which is incorporated herein by reference, discusses the processing of GPS signals 21a–21c received from GPS satellites 23 in order to determine the sensor's location values. Since the sensor 18 is located on or within the vehicle 17, the location values determined by the sensor 18 are assumed to match the location values of the vehicle 17 and the VCU 15.

It should be noted that the term "location value" shall be defined herein to mean any value or set of values that may be used to determine a location of a point on the Earth or within the Earth's atmosphere. This value may be a distance value, a coordinate value (i.e., grid value), polar value, vector value, or any other type of value or values known in the art for indicating locations of points.

Sensor 18 is designed to periodically transmit a signal 27 to vehicle manager 29 indicating the vehicle's current location values. Vehicle manager 29 is configured to receive signal 27 and to monitor the location of the vehicle 17 over time by processing multiple signals 27. The vehicle manager 29 can be implemented in software, hardware, or a combination thereof. In the preferred embodiment, as illustrated by way of example in FIG. 3, the vehicle manager 29 of the present invention along with its associated methodology is implemented in software and stored in computer memory 30 of a computer system 31.

Note that the vehicle manager 29 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the vehicle manager 29 may be magnetically stored and transported on a conventional portable computer diskette.

Figure 3:
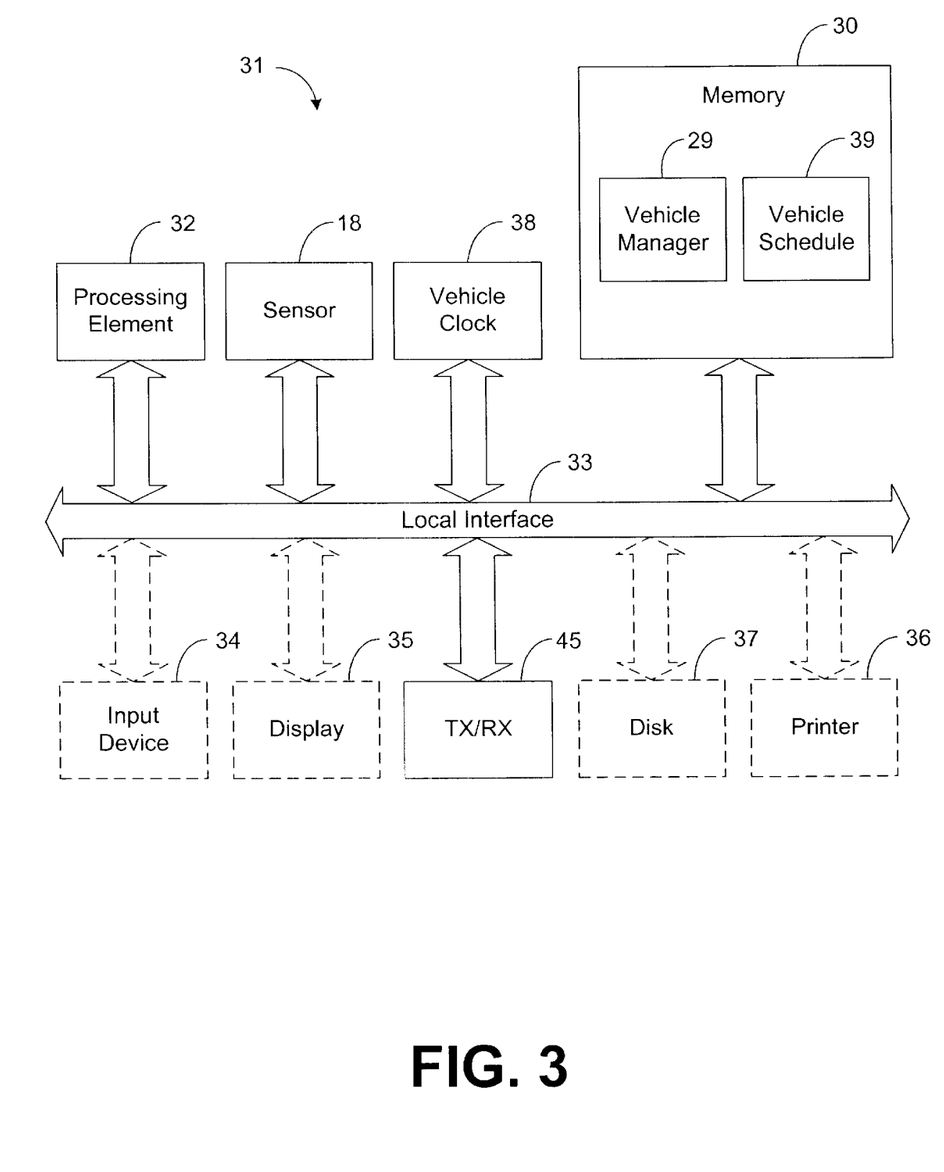
FIG. 3 is a block diagram illustrating a computer system implementing the functionality of the vehicle control unit of FIG. 2 in accordance with the preferred embodiment of the present invention.

The preferred embodiment of the computer system 31 of FIG. 3 comprises one or more conventional processing elements 32, such as a digital signal processor (DSP), that communicate to and drive the other elements within the system 31 via a local interface 33, which can include one or more buses. Furthermore, an input device 34 can be used to input data into the system 31, and screen display 35 or a printer 36 can be used to output data to the user. A disk storage mechanism 37 can be connected to the local interface 33 to transfer data to and from a nonvolatile disk (e.g., magnetic, optical, etc.). Furthermore, a vehicle clock 38 may be connected to the computer system 31 so that components of the system 31 may utilize data from the clock 38 to determine time through conventional techniques. It should be noted that input device 34, display 35, printer 36, and disk 37 are optional and are not necessarily a part of the preferred embodiment.

The vehicle manager 29 is preferably configured to maintain a predefined schedule 39, referred to herein as the "vehicle schedule 39," within memory 30. The predefined vehicle schedule 39 corresponds with a route of travel for the vehicle 17. In this regard, the predefined vehicle schedule 39 stored in memory 30 includes data defining locations or "checkpoints" along the vehicle's intended route of travel. Furthermore, each checkpoint is associated with a particular time value indicating when the vehicle 17 is expected to pass the associated checkpoint. Each checkpoint along with its associated time value may define an entry in the vehicle schedule 39.

In the preferred embodiment, the time value associated with a checkpoint corresponds to a time of day that the vehicle 17 is expected to pass the checkpoint. For example, the time value associated with a checkpoint may define the hour and minute that the vehicle 17 is expected to pass the checkpoint. Consequently, when the vehicle 17 reaches the location defined by the checkpoint, the time of day, as defined by vehicle clock 38, can be compared with the time value in schedule 39 associated with the checkpoint to determine whether the vehicle 17 is early, late, or on time. It should be noted that other data and other methodologies, such as the those disclosed in U.S. Pat. No. 5,400,020, for example, may be employed to determine whether or not the vehicle 17 is on schedule, without departing from the principles of the present invention.

As the vehicle 17 travels along its route, the vehicle manager 29 determines when the vehicle 17 passes a checkpoint by comparing the data received from sensor 18 with the checkpoint data stored in vehicle schedule 39. When the vehicle manager 29 determines that a checkpoint has been passed, the vehicle manager 29 is configured to determine a time value indicating the time of day by analyzing vehicle clock 38, and the vehicle manager 29 is configured to compare this time value with the time value in schedule 39 associated with the checkpoint.

The vehicle 17 is considered to be off schedule if the value for the time of day from clock 38 differs from the time value in schedule 39 by a predetermined amount. Otherwise the vehicle 17 is considered to be on schedule. For example, assume that the vehicle 17 is to be considered off schedule if the vehicle 17 is early or late by more than two minutes and assume that the vehicle 17 is scheduled to pass a checkpoint at 6:30 a.m. If the vehicle 17 passes the checkpoint between 6:28 a.m. and 6:32 a.m., the vehicle 17 is on schedule. If the vehicle 17 passes the checkpoint before 6:28 a.m., the vehicle is off schedule and is early. If the vehicle 17 passes the checkpoint after 6:32 a.m., the vehicle 17 is off schedule and is late.

If the vehicle manager 29 determines that the vehicle 17 is off schedule, the vehicle manager 29 is configured to transmit a status message to a base station control unit (BSCU) 40 (FIG. 1) indicating how much the vehicle is off schedule, and the vehicle manager 29 is also configured to update the entries in the schedule 39. For example, assume that the vehicle 17 passes the aforementioned checkpoint at 6:25 a.m. In this example, the vehicle 17 is off schedule and five minutes early. Therefore, the vehicle manager 29 transmits a status message to BSCU 40 via cellular network 42 indicating that the vehicle 17 is five minutes early and decreases the expected times stored in the schedule 39 by five minutes. As a result, the schedule 39 is adjusted to account for the vehicle's earliness, and the vehicle 17 will not be deemed off schedule when the vehicle 17 passes the other checkpoints, provided that the rate of travel of the vehicle 17 continues as expected for the remainder of the route. Similarly, if the vehicle 17 passes the aforementioned checkpoint at 6:35 a.m., then the vehicle manager 29 is configured to transmit a status message indicating that the vehicle 17 is five minutes late and is configured to increase the times stored in the schedule 39 by five minutes.

It should be noted that updating the schedule 39 is not necessary in implementing the present invention. However, if the vehicle 17 is early or late at one checkpoint, the vehicle 17 will likely be respectively early or late at other checkpoints, causing the vehicle manager 29 to make an off schedule determination and to transmit a status message at each of the remaining checkpoints in the route. By updating the times in schedule 39, the number of status messages transmitted to the BSCU 40 may be reduced in monitoring the travel of the vehicle 17.

It should be further noted that the status message transmitted by VCU 15 may be communicated via any suitable technique and that utilization of the cellular network 42 is not necessary. In this regard, other types of networks may be used to communicate the status message, or the status message may be communicated directly to the base station control unit 40 without the use of any type of communication network. For example, the status message may be communicated via short wave radio.

Base Station Control Unit

Figure 4:
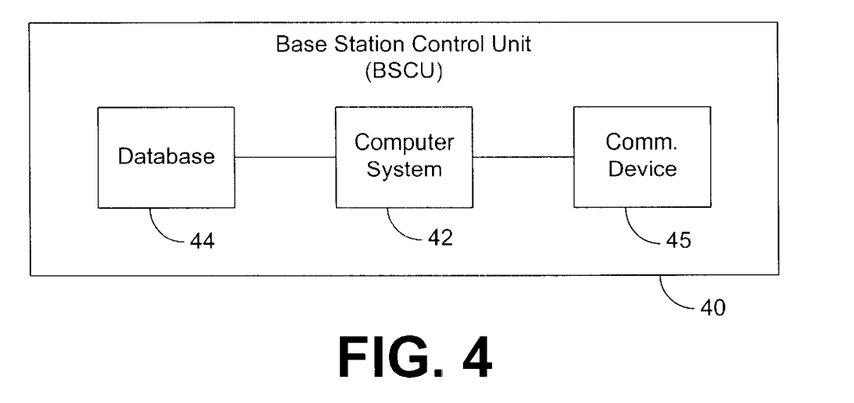
FIG. 4 is a block diagram illustrating an implementation of a base station control unit depicted in FIG. 1.

Referring to FIG. 4, the base station control unit (BSCU) 40 preferably comprises a computer system 42 interfaced with a database 44 and a communications device 45. The communications device 45 may be a computer system separate to system 42 or may be a component (e.g., peripheral device) of the computer system 42. A suitable communications device 45 is described in U.S. Patent application Ser. No. 09/516,577 entitled, "Base Station System and Method for Monitoring Travel of Mobile Vehicles and Communicating Notification Messages," which is incorporated herein by reference. Furthermore, database 44 may be separate from system 42, as shown by FIG. 4, or may be employed by memory within system 42.

Figure 5:
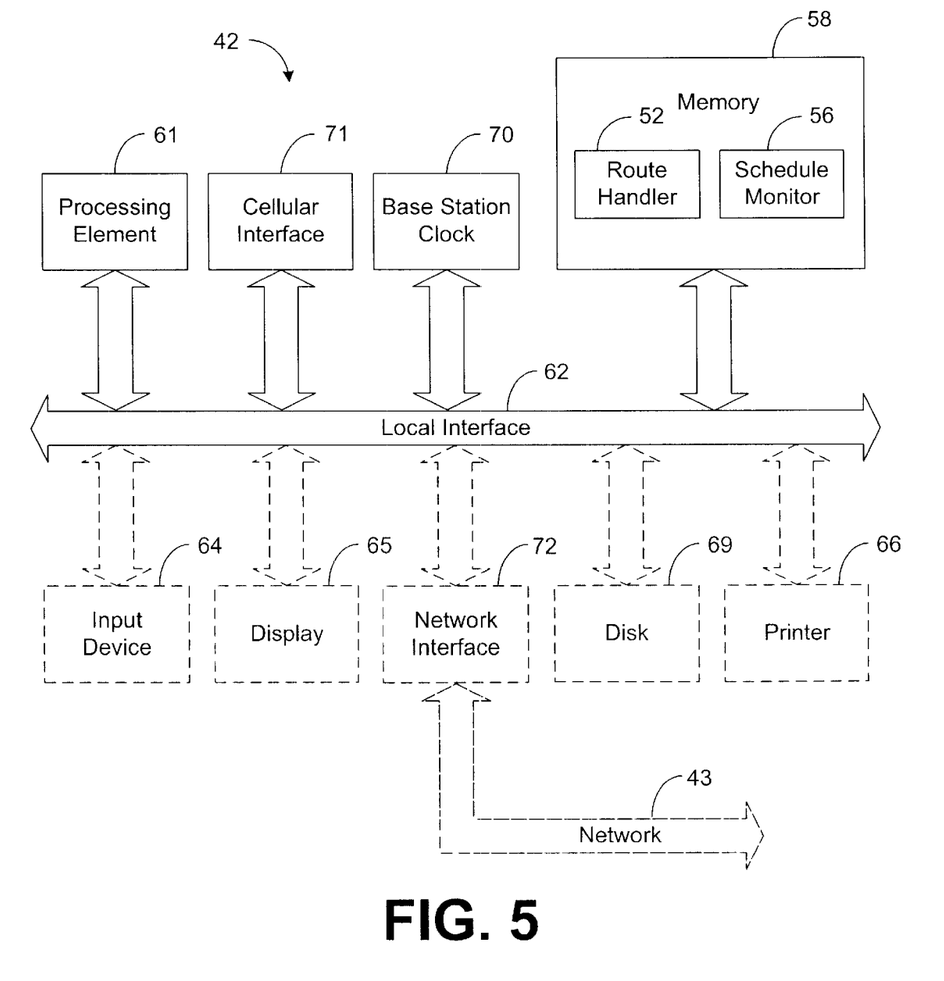
FIG. 5 is a block diagram illustrating a computer system depicted in FIG. 4.

Referring to FIG. 5, the computer system 42 includes a route handler 52 and a schedule monitor 56. The route handler 52 and schedule monitor 56, which will be described in further detail hereafter, can be implemented in software, hardware, or a combination thereof. In the preferred embodiment, as illustrated by way of example in FIG. 5, the route handler 52 and schedule monitor 56 of the present invention along with their associated methodology are implemented in software and stored in memory 58.

Further shown by FIG. 5, the computer system 42 may include one or more processing elements 61, such as a DSP, that communicate to and drive the other elements within the system 42 via a local interface 62, which may include one or more buses. Furthermore, an input device 64, for example, a keyboard or a mouse, can be used to input data from a user of the system 42, and screen display 65 or a printer 66 can be used to output data to the user. A disk storage mechanism 69 can be connected to the local interface 62 to transfer data to and from a nonvolatile disk (e.g., magnetic, optical, etc.). Furthermore, a base station clock 70 may be connected to the computer system 42 so that components of the system 42 may utilize data from the clock 70 to determine time through conventional techniques. The system 42 may also be connected to a cellular interface 71, or other type of suitable interface, for communicating with VCU 15. It may also be desirable for computer system 42 to include a network interface 72 that allows the system 42 to exchange data with a network 43. It should be noted that input device 64, display 65, printer 66, disk 69, network interface 72, and network 43 are optional and are not necessarily a part of the preferred embodiment.

Referring again to FIG. 4, the database 44 shown by FIG. 4 preferably stores data defining the routes of one or more vehicles 17. For example, the database 44 may include entries that are correlated with a vehicle 17 of the system 10 (FIG. 1), wherein each entry includes sufficient data to define a checkpoint that may be used to monitor the travel of the vehicle 17. The checkpoints defined in the database 44 for a particular vehicle 17 are preferably the same checkpoints defined in vehicle schedule 39 (FIG. 3) for the particular vehicle 17. Furthermore, the entry may also include data to indicate the time of day that the vehicle 17 is expected to reach the checkpoint defined by the entry. Therefore, the database 44 includes sufficient data to define the checkpoints used to monitor the vehicles 17 associated with the system 10 and the times that the vehicles 17 should respectively pass the checkpoints.

The database 44 of the preferred embodiment also includes data indicating when different users are to be notified of an impending arrival of at least one of the vehicles 17 associated with the system 10. For example, the database 44 may include data indicating that a user should be notified a certain amount of time before or after a particular vehicle 17 passes a particular checkpoint. Therefore, at any time, the database 44 can be queried to determine which checkpoints are to be passed by a particular vehicle 17 and when the particular vehicle 17 is expected to pass each of the checkpoints. The database 44 also can be queried to determine when users are to be notified of the particular vehicle's impending arrival. To facilitate querying of the database 44, the entries of the database 44 may be keyed by vehicle numbers used to identify the vehicles associated with the system 10.

To illustrate the configuration and use of the database 44, assume that a user would like to be notified when a particular vehicle 17 is two minutes from a particular location, such as the user's house or a scheduled vehicle stop. Assume further that the vehicle 17 is scheduled to pass a checkpoint every five minutes after starting its route and that the particular location is expected to be reached seventeen minutes after the vehicle 17 starts its route. In this scenario, the database 44 should include data that defines each of the checkpoints along the vehicle's route and that indicates the time that the vehicle 17 is expected to pass each of the checkpoints. The database 44 should also indicate that the individual is to be notified when the vehicle 17 passes the third checkpoint, since the vehicle 17 is expected to pass the third checkpoint fifteen minutes into the route (i.e., two minutes before the vehicle 17 is expected to reach the particular location).

In the preferred embodiment, the database 44 also includes sufficient information to enable the individual to be automatically notified once a determination is made that the user should be notified. For example, the database 44 may include the individual's telephone number, pager number, e-mail address, or other type of contact information, depending on the methodology used to notify the individual.

The route handler 52 (FIG. 5) is configured to query the database 44 to build a list of notification events that are expected to occur during a specified time period. A "notification event" is the generation of a notification message to be transmitted to a user to notify the user of an impending arrival of a vehicle 17 associated with the system 10. For example, the route handler 52 may query the database 44 at the beginning of a day to determine each notification event that should occur during the course of the day, and the route handler 52 then builds a list of these events. The list should not only indicate what notification events are to occur but also should indicate at what time each notification event is expected to occur. The list may also include contact information (e.g., telephone numbers, pager numbers, e-mail addresses etc.) to facilitate the process of contacting the users associated with the notification events in the list.

Figure 6:
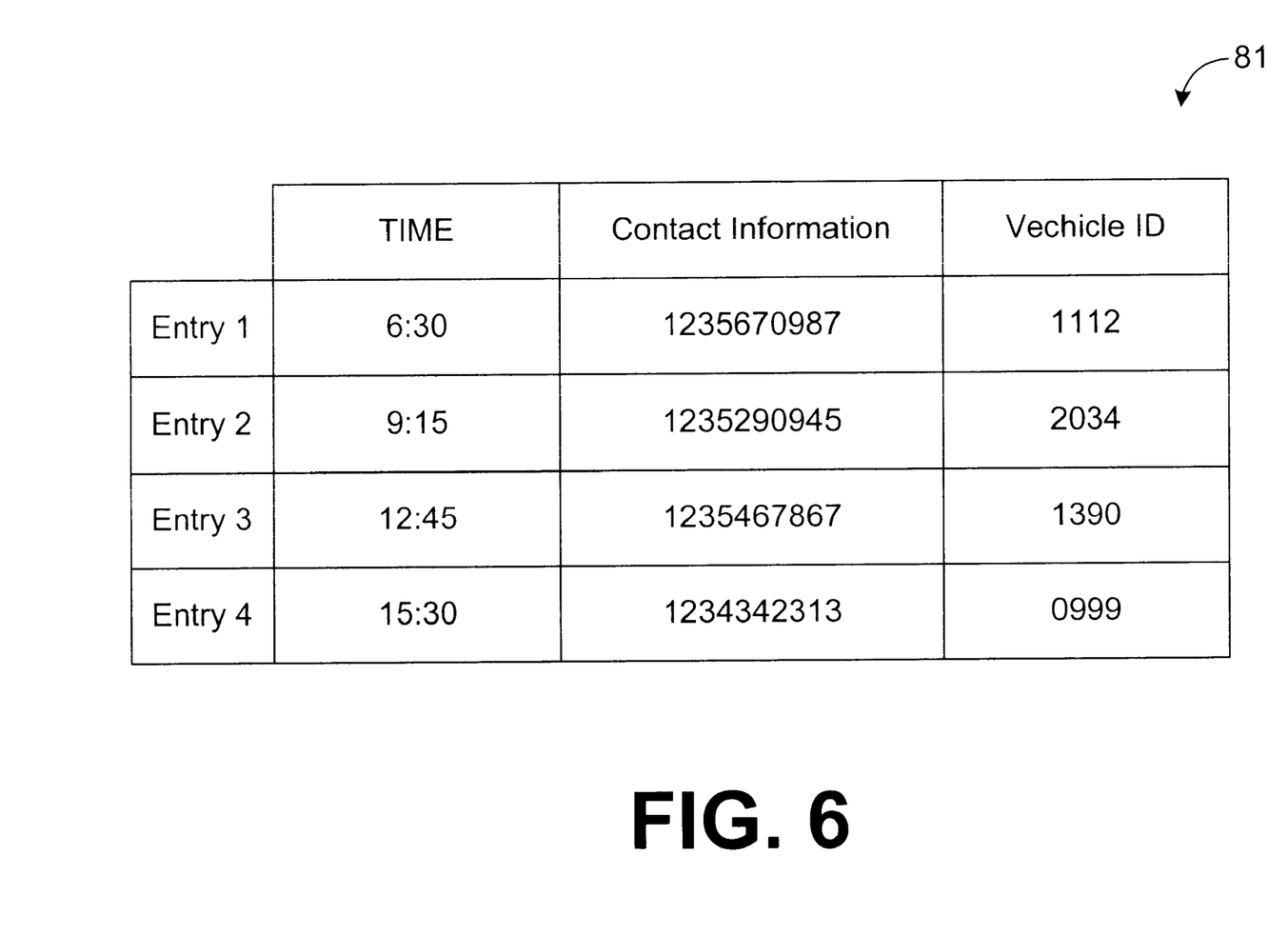
FIG. 6 is a schematic illustrating an exemplary list of notification events generated by the route handler of FIG. 5.

FIG. 6 shows an exemplary list 81 that may be produced by the route handler 52. The list 81 depicts four entries, although any number of entries may be included in the list 81. Each entry of the list 81 is associated with a respective notification event and indicates: (1) the time at which the respective notification event is expected to occur, (2) the contact information (e.g., telephone number, pager number, e-mail address etc.) associated with the particular user, and (3) a vehicle number identifying the particular vehicle 17 associated with the notification event. For example, assume that "entry 1" is associated with a notification event for a user that would like to be notified when a particular vehicle (vehicle number "1112") is five minutes from a particular location. Based on the information stored in database 44, assume that the route handler 52 determines that the notification event should occur at 6:30 a.m. (five minutes before the particular vehicle 17 is scheduled to arrive at the particular location). As a result, "entry 1" of the list 81 indicates that the notification event associated with the entry is to occur at 6:30 a.m. "Entry 1" also provides the user's contact information and the vehicle number ("1112") of the vehicle 17 that is to arrive at the particular location. Each of the other entries can be similarly configured based on the information associated with the notification events associated with the other entries. Once the route handler 52 has defined the list 81, the route handler 52 transmits the list 81 to schedule monitor 56.

When the BSCU 40 receives a status message from one of the VCUs 15 indicating that one of the vehicles 17 is early or late, the route handler 52 transmits an update request based on the received status message. In response to the update request, the schedule monitor 56 is designed to update the list 81, if the list 81 includes an entry associated with a notification event pertaining to the one vehicle 17.

For example, assume that the route handler 52 receives a status message indicating that the vehicle 17 associated with "entry 1" (i.e., vehicle number "1112") is seven minutes late. In response, the route handler 52 transmits an update request to schedule monitor 56. The update request preferably includes information indicating which vehicle 17 is off schedule and how much the vehicle 17 is off schedule. Based on this update request, the schedule monitor 56 determines that the vehicle 17 associated with the update request (i.e., vehicle number "1112") is seven minutes late. The schedule monitor 56 is designed to traverse the list 81 to identify each entry associated with the vehicle number "1112" and is configured to increase the time values stored in the identified entries by seven minutes to account for the tardiness of vehicle number "1112." Therefore, in the list 81 depicted by FIG. 6, the schedule monitor 56 changes the time value in "entry 1" from "6:30" to "6:37." As a result, the notification event associated with "entry 1" should not occur until 6:37 a.m.

Upon receiving a status message, the route handler 52 is also designed to update the database 44. Therefore, in the example described hereinbefore, the route handler 52 is designed to input data into the database 44 indicating that vehicle number "1112" is seven minutes late. As a result, the database 44 can be consulted at any time to determine not only the scheduled route of any vehicle 17 but also to determine the status of the vehicle 17 as the vehicle 17 is traveling its route. In this regard, if the database 44 does not indicate that a particular vehicle 17 is early or late, then it can be assumed that the vehicle 17 should arrive at its future checkpoints on schedule. However, if the database 44 indicates that the vehicle 17 is early or late, then it can be assumed that the vehicle 17 will arrive at its future checkpoints off schedule by the amount indicated by the database 44.

The schedule monitor 56 is configured to periodically scan the list 81 to determine if a notification event should occur (i.e., if a notification message should be transmitted to a user). In this regard, when the time of the day, as determined from base station clock 70, corresponds to (e.g., matches) the time indicated by one of the entries in the list 81, the schedule monitor 56 determines that the notification event associated with the corresponding entry should occur. Therefore, to initiate the occurrence of the notification event, the schedule monitor 56 is designed to transmit a notification request to the communications device 45, which transmits a notification message in response to the notification request, as will be described in more detail hereinbelow.

Figure 7:
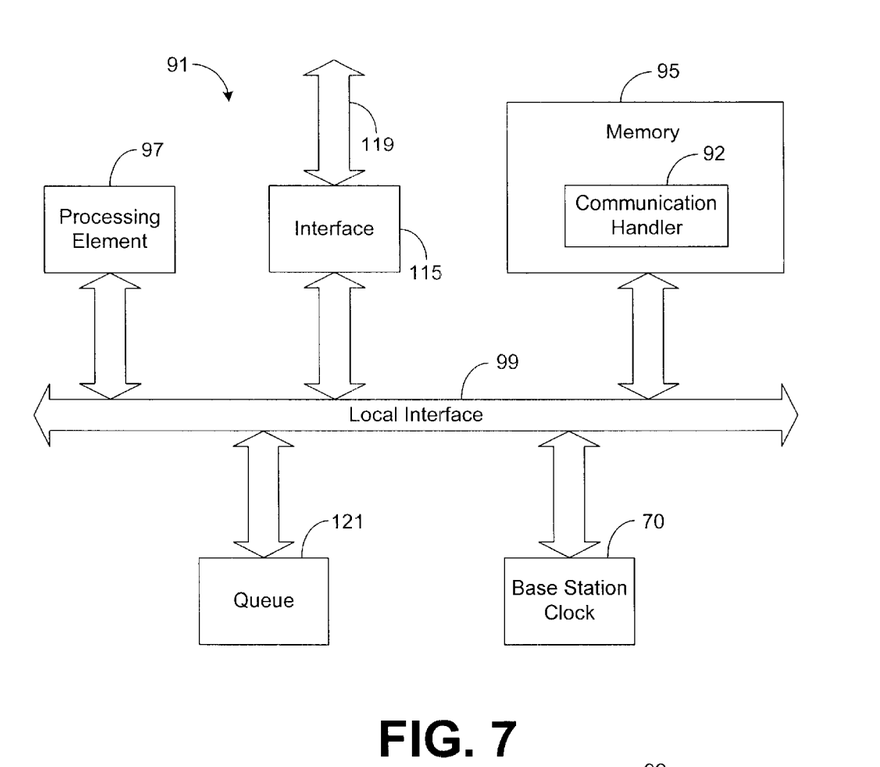
FIG. 7 is a block diagram illustrating a computer system implementing the functionality of the communications device depicted in FIG. 4.

Referring to FIG. 7, a computer system 91 may be employed to implement the communications device 45. The system 91 may include a communication handler 92 to control the operation of the system 91. The communication handler 92 may be implemented in software, hardware, or a combination thereof. In the preferred embodiment, as depicted by FIG. 7, the communication handler 92 is implemented in software and stored in memory 95.

Further shown by FIG. 7, the computer system 92 may include one or more processing elements 97, such as a DSP, that communicate to and drive the other elements within the system 92 via a local interface 99, which may include one or more buses. Furthermore, the base station clock 70 may be connected to the computer system 91 so that components of the system 91 may utilize data from the clock 70 to determine time through conventional techniques. The computer system 91 of the preferred embodiment also includes an interface 115, such as a telephone interface, for example, coupled to a plurality of communication connections 119 that enables the communication handler 92 to transmit the notification messages across the connections 119. As an example, the interface 115 may be coupled to a T1 trunk or a plurality of T1 trunks that, as known in the art, are capable of placing up to twenty-four telephone calls each. Various devices may be employed to implement the interface 115 depending on the type of communication used to transmit the notification messages. For example, the interface 115 may be a telephone interface, a cellular interface, a modem, or other type of device or devices for communicating notification messages.

Figure 8:
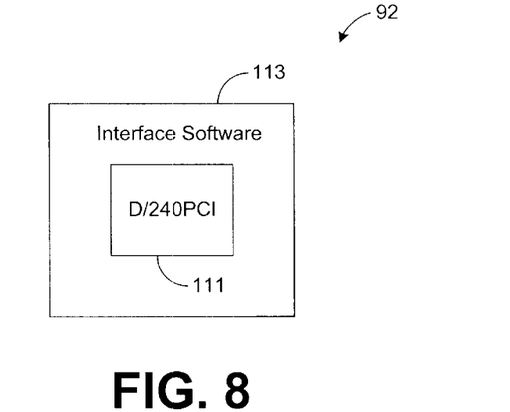
FIG. 8 is a block diagram illustrating a more detailed view of a communication handler depicted in FIG. 7.

The communication handler 92 is preferably capable of processing multiple notification requests and of simultaneously communicating multiple notification messages to users to warn the users of impending arrivals of vehicles 17. For example, in one embodiment, the communication handler 92 is implemented by a D/240PCI card 111 manufactured by Dialogic Corp., as shown by FIG. 8. Other software 113 may be implemented to interface the notification messages with the Dialogic card. This other software 113 may include Visual Voice software, which is a well known set of software commonly used to interface data with the Dialogic card 111. Furthermore, in other embodiments, the communication handler 92 may be configured to transmit notification messages one at a time, if desired.

As shown by FIG. 1, the notification messages may be routed to one or more users via a communication network, such as the publicly switched telephone network (PSTN) 123. In this regard, the network 123 routes each notification message transmitted by communication handler 92 to a communication device 124, such as a telephone, for example, at a premises 126 of a user that is to receive the notification message. Upon receiving the notification message from network 123, the communication device 124 communicates the notification message to the user. It should be noted that it is not necessary for notification messages to be communicated via telephone calls and that the communication device 124 may be any device capable of communicating a notification message. For example, the communication device 124 may be pager in one embodiment. In another embodiment, the communication handler 92 transmits a notification message to the device 124 via the Internet. For example, the communication handler 92 may transmit an e-mail message to the device 124, which in this example is a computer capable of reading the message and displaying the message to the user.

If the communication handler 92 cannot immediately transmit a notification message in response to a notification request, then the communication handler 92 is designed to store the notification request into a queue 121 (FIG. 7). The communication handler 92 then services the notification requests stored in the queue 121 on a first in, first out (FIFO) basis. Therefore, the communication handler 92 services the notification requests in the order in which they were received by the communication handler 92.

As stated hereinbefore, each notification request is generated in response to a determination that a user should be warned of an impending arrival of a particular vehicle 17 at a particular location. Therefore, each notification request preferably includes contact information to enable the communication handler 92 to send a notification message to the particular user associated with the notification request or includes other information to enable the communication handler 92 to retrieve such contact information from the database 44. As a result, the communication handler 92 is configured to utilize contact information included in the notification request or stored in the database 44 to automatically transmit a notification request to the user associated with the notification request.

It should be noted that the list 81 is not a necessary feature of the present invention. In this regard, the database 44 can be repeatedly searched to determine when to generate notification requests (i.e., where a notification event should occur). However, repeatedly searching the database 44 could result in the unnecessary processing of a vast amount of data, depending on the amount of data and entries stored in database 44. Utilization of the list 81 enables a much smaller amount of data to be searched in identifying whether notification requests should be generated during a particular time interval.

Balancing of Notification Messages

In some situations, depending on when the notification events are scheduled to occur, the schedule monitor 56 may generate a relatively large number of notification requests in a relatively short time. As a result, the communication handler 92 may be unable to process each of the notification requests quickly. In this regard, the communication handler 92 may be required to store many of the notification requests in the queue 121, thereby significantly delaying when the notification messages associated with at least some of the queued notification requests are transmitted.

Depending on the amount of delay, the user that receives a delayed and, therefore, late notification message may not have sufficient time to adequately prepare for the arrival of the vehicle associated with the notification message. Therefore, to prevent excessive delays, the schedule monitor 56 is preferably designed to monitor the notification events that are expected to occur, and if a large number of notification events are expected to occur during a relatively short time period, the schedule monitor 56 is designed to generate some of the notification requests associated with these notification events early. Therefore, the number of notification requests generated should be spread out over a longer time period, thereby reducing the amount of delays occurring in the communications device 45. Although some of the users may receive notification messages slightly early, it is generally preferable for users to receive an early message as opposed to a late one.

In implementing the aforementioned functionality, the schedule monitor 56 is designed to determine how many notification events are scheduled to occur during a predetermined time period. For example, the schedule monitor 56 may analyze the times associated with each entry in the list 81 to determine which entries are associated with a notification event that is expected to occur within the next two minutes or some other time frame. In other words, the schedule monitor 56 may analyze the times associated with each entry in the list 81 to determine which entries indicate that a notification request should be generated in the next two minutes or some other time frame. If the number of notification events scheduled to occur during this time frame exceeds a predefined threshold, then the schedule monitor is designed to generate notification requests for at least some of the notification events early.

As an example, assume that the communications device 45 can transmit up to five notification messages per minute and that the predefined threshold is set to five, although other thresholds could be used. Further, assume that there are eight notification events scheduled to occur between one and two minutes from the present time. If the schedule monitor 56 waits until the scheduled times of the notification events to generate notification requests, then the communications handler 45 will be able to transmit a maximum of five notification requests in response to the notification requests between the first and second minute (i.e., at least between one and two minutes from the present time). As a result, at least three of the notification messages transmitted in response to the aforementioned notification requests will be transmitted after the second minute, and these notification messages will be late.

To prevent this delay (i.e., to prevent any of the aforementioned notification messages from being transmitted after the second minute) the schedule monitor 56 is configured to generate a notification request for at least three of the notification events during the first minute (i.e., within one minute of the present time). Therefore, it is possible for the communications device 45 to transmit three of the notification messages during the first minute and five of the notification requests during the second minute. As a result, none of the notification messages are transmitted after the second minute, and none of the recipients of the notification messages receive a late message.

It should be noted that, in some embodiments, the VCU 15 may transmit the notification messages to user premises 126 instead of BSCU 40. In these embodiments, the VCU 15 preferably utilizes the principles discussed herein to generate notification requests and to transmit the notification messages. In particular, the VCU 15 preferably reschedules the notification events defined by vehicle schedule 39, as necessary, to prevent excessive delays in transmitting the notification messages. In such embodiments, the contact information for establishing communication with user communications devices 126 and the preference data indicating when notification messages are scheduled for transmission are preferably stored in the VCU 15 instead of the BSCU 40.

Operation

The preferred use and operation of the system 10 and associated methodology are described hereafter.

Initially, a vehicle schedule 39 is respectively stored in the VCU 15 of each vehicle 17 associated with the system 10. As set forth hereinbefore, the vehicle schedule 39 includes data defining a plurality of checkpoints along the respective vehicle's route or routes of travel and the expected time that the respective vehicle 17 is to pass each of the checkpoints. There are a variety of methodologies that may be employed to determine the information stored in the VCU 15. In one embodiment, the data is accumulated from the sensor 18 and the vehicle clock 38, as the vehicle 17 travels the route or routes. Such a methodology is described in more detail in U.S. patent application entitled, "Apparatus and Method for Monitoring Travel of a Mobile Vehicle," assigned Ser. No. 09/395,497, and filed on Sep. 14, 1999, which is incorporated herein by reference.

The route data stored in vehicle schedule 39 is also stored in database 44 of BSCU 40. Furthermore, contact information associated with each user that is to be notified of an impending arrival of one of the vehicles 17 is also stored in database 44 so that the users may be sent a notification message at the appropriate time. Each user is preferably allowed to select a vehicle 17 and a time when the user would like to be warned of an impending arrival of the selected vehicle 17. The process of enabling a user to select a vehicle and a time is further described in U.S. patent application entitled, "System and Method for Activation of an Advance Notification System for Monitoring and Reporting Status of Vehicle Travel," assigned Ser. No. 09/163,588, and filed on Sep. 30, 1998, which is incorporated herein by reference.

The route handler 52 builds a list 81 of notification events that should occur during a specified time period and transmits this list 81 to schedule monitor 56. For illustrative purposes, assume that the user selects to receive a notification message when a particular vehicle 17 is five minutes from a particular location. Further assume that the vehicle 17 is scheduled to arrive at the particular location at 6:35 a.m. As a result, a notification message should be generated and transmitted to the user at 6:30 a.m., if the vehicle 17 is on schedule when traveling the route. Therefore, assuming that 6:30 a.m. is within the aforementioned specified time period, the route handler 52 defines an entry in the list 81 indicating that the user should be so notified at 6:30 a.m. (i.e., that a notification event should occur at 6:30 a.m.) "Entry 1" of the list 81 depicted by FIG. 6 is suitable for implementing the present invention in the context of the foregoing example.

At some point, the vehicle 17 begins to travel its route. Before or during travel of the route, the vehicle clock 38 should be synchronized with the BSCU clock 70. As vehicle 17 travels its route, it passes checkpoints, and its VCU 15 monitors its progress. In this regard, based on the signals provided by sensor 18, the VCU 15 determines when vehicle 17 passes each of its checkpoints. When vehicle 17 passes a checkpoint, the VCU 15 determines whether the vehicle 17 is on or off schedule by comparing the current time, as defined by vehicle clock 38, with the time value associated with the passed checkpoint and stored in vehicle schedule 39.

If vehicle 17 is determined to be off schedule, then the VCU 15 transmits a status message to BSCU 40 indicating how much the vehicle 17 is off schedule and updates the time values in the vehicle schedule 39 associated with the remaining checkpoints (i.e., the checkpoints that have yet to be passed by vehicle 17). The VCU 15 continues to monitor the progress of vehicle 17 until vehicle 17 passes the last checkpoint on the route.

Upon receiving a status message from the VCU 15, the route handler 52 updates the database 44 to indicate that the vehicle 17 is off schedule by an amount indicated by the status message. Next, the route handler 52 transmits an update request to the schedule monitor 56 indicating that the vehicle 17 associated with the status message is off schedule by a specified amount (e.g., a specified number of minutes early or late). The route handler 52 continues to check for status messages until each notification event in the list 81 has occurred.

The schedule monitor 56 updates the list 81, when the schedule monitor 56 receives an update request from route handler 52. In this regard, when the schedule monitor 56 receives an update request indicating that a vehicle 17 is off schedule, the schedule monitor 56 changes the time values in the entries associated with the vehicle 17 by an amount that the vehicle 17 is off schedule.

The schedule monitor 56 periodically monitors the list 81 to determine when notification events should occur. To illustrate how the schedule monitor 56 performs this functionality in the preferred embodiment, assume that the schedule monitor 56 analyzes the list 81 every minute and determines which notification events are scheduled to occur during each minute of the next four minutes. Also, assume that it is desirable for no more than five notification events to occur during any single minute.

Figure 9A:
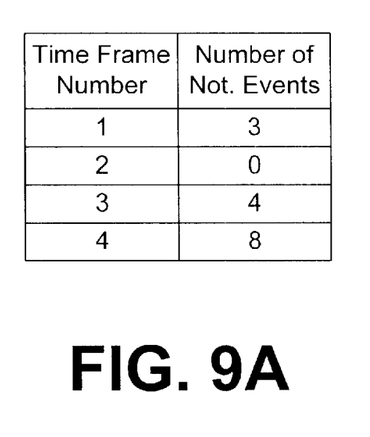
FIG. 9A is a schematic illustrating an exemplary set of results produced by the schedule monitor depicted in FIG. 5. The results indicate the number of notification events detected in different time frames.

The schedule monitor 56 keeps track of the number of notification events that are scheduled to occur during each minute of the next four minutes. As an example, refer to FIG. 9A, which depicts an exemplary set of results from the schedule monitor's analysis of a list of notification events. In this regard, FIG. 9A, shows that three notification events are scheduled to occur between the time of the schedule monitor's analysis and one minute later (time frame number 1). No notification events are scheduled to occur between one minute later and two minutes later (time frame number 2), four notification events are scheduled to occur between two minutes later and three minutes later (time frame number 3), and eight notification events are scheduled to occur between three minutes later and four minutes later (time frame number 4).

Therefore, the scheduled notification events are acceptable, except that the number of notification events scheduled to occur in time frame 4 is too great (i.e., exceeds the maximum threshold by three events). If possible, it is desirable to reschedule three of the eight notification events associated with time frame 4 to occur during earlier time frames so that the number of notification requests transmitted to communications device 45 is more spread out.

In this regard, the schedule monitor 56 first determines whether any of the three excessive notification events in time frame 4 can be moved to time frame 3 without causing the number of notification events in time frame 3 to exceed the threshold number of five. Since time frame 3 only has four notification events scheduled, one of the notification events in time frame 4 can be moved to time frame 3 without causing the number of notification events in time frame 3 to exceed the threshold. This is accomplished by reducing the time that the one of the notification events in time frame 4 is scheduled to occur by one minute.

Figure 9B:
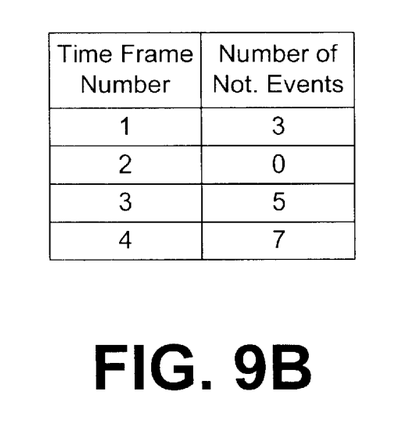
FIG. 9B is a schematic illustrating the results depicted in FIG. 9A after one of the notification events in time frame 4 has been rescheduled to time frame 3.
Figure 9C:
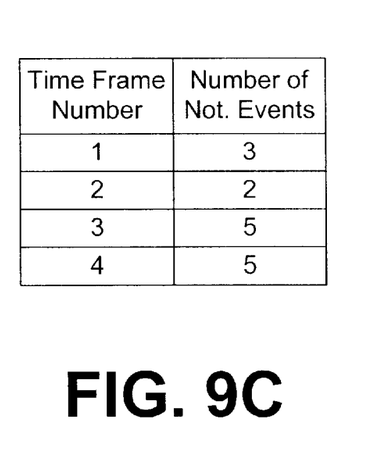
FIG. 9C is a schematic illustrating the results depicted in FIG. 9B after two of the notification events in time frame 4 have been rescheduled to time frame 2.

As a result of the foregoing rescheduling, the distribution of the notification events is changed, as shown by FIG. 9B. In this regard, the same distribution is shown as in FIG. 9A except that five notification events are scheduled to occur in time frame 3 and that seven notification events are scheduled to occur in time frame 4. Since time frame 4 still includes two notification events more than the allowable threshold number, the schedule monitor 56 determines whether any notification events can be moved to the next earlier time frame (i.e., time frame 2) without causing the number of notification events in time frame 2 to exceed the threshold number. Since no notification events are scheduled to occur during time frame 2, up to five notification events may be rescheduled during time frame 2. Therefore, two of the notification events in time frame 4 are rescheduled to either time frame 2 or time frame 3. If the two notification events are rescheduled to time frame 3, then two of the notification events previously scheduled for time frame 3 are rescheduled to time frame 2. In any event, after rescheduling the two notification events in time frame 4, the distribution of the notification events is indicated by FIG. 9C. As shown by FIG. 9C, the distribution of notification events is now acceptable since the number of notification events scheduled in each time frame is equal to or less than the predefined threshold number.

Figure 9D:
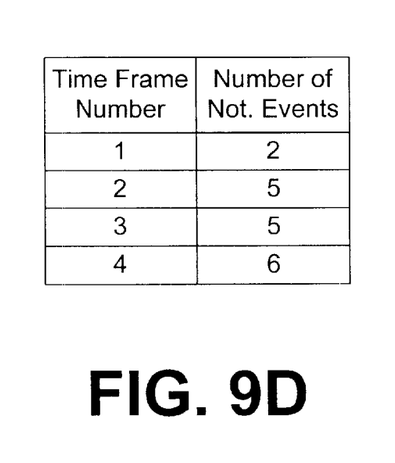
FIG. 9D is a schematic illustrating the results depicted in FIG. 9C after the schedule monitor depicted by FIG. 5 performs another analysis.

As a result of the aforementioned rescheduling, the schedule monitor 56 is scheduled to generate three notification requests during time frame 1, two notification requests during time frame 2, and five notification requests during each of the time frames 3 and 4. Note that this distribution may change on the next analysis by the schedule monitor 56, as a new set of notification events will be scheduled to occur in time frame 4. For example, on the next analysis by the schedule monitor 56 the distribution may appear according to FIG. 9D. The notification events in time frames 2, 3, and 4, have respectively moved up one time frame into time frames 1, 2, and 3, and a new set of notification events are now in time frame 4. Since the number of notification events in time frame 4 now exceeds the threshold number, one of the notification events in the time frame 4 should be rescheduled according to the techniques described hereinbefore to an earlier time frame, if possible. If each of the time frames includes a number of notification events that is equal to or greater than the predefined threshold, then it is not possible to move any one notification event of one time frame into another time frame without increasing the number of notification events in the other time frame to a number above the predefined threshold. Therefore, in such a situation, no redistribution occurs, and it is likely that some of the notification messages transmitted in response to some of the notification events will be late, unless other steps can be taken to prevent such a result.

It should be noted that there are various methodologies for determining when notification events should occur and the present invention should not be limited to the particular embodiment or embodiments disclosed herein. In this regard any method of scheduling notification events and for determining when notification events should occur, as long as the methodology implemented allows the notification events to be rescheduled when a determination is made that too many notification events are scheduled to occur during a particular time period.

It should be further noted that each notification message may provide a status report for the vehicle 17 associated with the notification message. For example, the notification message may indicate that the vehicle 17 is a certain number of minutes from a particular location. The communication handler 92 may retrieve information from the database 44 to form the notification message. By retrieving the information for the status report directly from the database 44, the communication handler 92 utilizes the most recent information available in providing any status reports to the user.

It should be noted that the present invention has been described herein as tracking vehicles 17 and determining when to generate a notification message to a user based on time values. However, other types of values may be used to monitor the travel of the vehicle 17. For example, a notification message could be generated when a particular vehicle comes within a certain distance of a particular location. U.S. patent application entitled, "Base Station Apparatus and Method for Monitoring Travel of a Mobile Vehicle," assigned Ser. No. 09/395,501, and filed on Sep. 14, 1999, which is incorporated herein by reference, describes how distance values may be used to determine when to transmit notification messages.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

Now, therefore, the following is claimed:

1. A system for notifying users of impending arrivals of vehicles, comprising:

memory for storing data, said data indicating when notification messages are scheduled for transmission to remote communications devices to warn users of impending arrivals of at least one vehicle; and logic configured to determine that at least one of said notification messages is scheduled for transmission during a particular time period, to determine a number of said notification messages that are scheduled for transmission during said particular time period, to compare said number to a threshold number, and to cause said one notification message to be transmitted prior to said time period when said number exceeds said threshold.

2. The system of claim 1, further comprising:

a sensor disposed on said one vehicle, said sensor configured to transmit location signals, each of said location signals indicating a location of said sensor;

a vehicle control unit disposed on said one vehicle and interfaced with said sensor, said vehicle control unit configured to receive said location signals and to transmit a message based on said location signals, wherein said logic is remotely located from said one vehicle and is configured to update said data based on said message transmitted from said vehicle control unit.

3. The system of claim 1, further comprising:

a sensor configured to transmit location signals, each of said signals indicating a present location of said one vehicle, wherein said data indicates a plurality of checkpoints that said one vehicle is scheduled to pass, said data further indicating a time that said one vehicle is respectively scheduled to pass each of said checkpoints, and wherein said logic is further configured to update said data based on said location signals.

4. The system of claim 1, further comprising:

a communications device configured to receive a status message transmitted from a vehicle, said status message indicating whether said vehicle is on schedule, wherein said logic is further configured to update said data based on said status message.

5. The system of claim 1, wherein said logic is further configured to determine when each of said notification messages should be transmitted based on said data and to transmit notification requests to cause said notification messages to be transmitted, each of said notification requests respectively corresponding with one of said notification messages, and wherein said system further comprises:

a communications device configured to receive said notification requests and to store said notification requests into a queue, said communications device configured to retrieve said notification requests from said queue and to transmit notification messages based on said notification requests retrieved from said queue.

6. The system of claim 5, further comprising:

a clock configured to transmit time signals, wherein said data includes time values respectively indicating times that said notification messages are respectively scheduled for transmission, said logic configured to compare a value of one of said time signals to one of said time values to determine whether to transmit one of said notification requests.

7. A method for notifying users of impending arrivals of vehicles, comprising the steps of:

storing data indicating when notification messages are scheduled for transmission to remote communications devices;

determining that at least one of said notification messages is scheduled for transmission during a particular time period;

determining a number of said notification messages that are scheduled for transmission during said particular time period;

comparing said number to a threshold number;

causing said one notification message to be transmitted prior to said time period when said number exceeds said threshold number; and notifying one of said users of an impending arrival of a vehicle via said one notification message.

8. The method of claim 7, further comprising the steps of:

determining a location of said vehicle;

transmitting a location signal indicating said location of said vehicle; and updating said data based on said location signal.

9. The method of claim 7, further comprising the steps of:

determining when each of said notification messages should be transmitted based on said data;

transmitting notification requests based on said determining when step;

storing said notification requests into a queue;

retrieving said notification requests from said queue; and transmitting said notification messages based on said notification requests retrieved from said queue.

10. A method for notifying users of impending arrivals of vehicles, comprising the steps of:

storing data indicating when notification messages are scheduled for transmission to remote communications devices;

determining that at least one of said notification messages is scheduled for transmission during a particular time period;

determining a number of said notification messages that are scheduled for transmission during said particular time period;

comparing said number to a threshold number;

changing when said one notification message is scheduled for transmission in response to a determination that said number exceeds said threshold number; and notifying one of said users of an impending arrival of a vehicle via said one notification message.

11. The method of claim 10, further comprising the steps of:

determining a location of said vehicle;

transmitting a location signal indicating said location of said vehicle; and updating said data based on said location signal.

12. The method of claim 10, further comprising the steps of:

determining when each of said notification messages should be transmitted based on said data;

transmitting notification requests based on said determining when step;

storing said notification requests into a queue;

retrieving said notification requests from said queue; and transmitting said notification messages based on said notification requests retrieved from said queue.

* * * * *